April 17, 1934.   W. C. VAN GEEL ET AL   1,955,397
ELECTRODE SYSTEM
Filed Oct. 7, 1931

INVENTOR
WILLEM CHRISTIAAN VAN GEEL
BY  and HENDRIK EMMENS
ATTORNEY

Patented Apr. 17, 1934

1,955,397

UNITED STATES PATENT OFFICE 1,955,397

ELECTRODE SYSTEM

Willem Christiaan van Geel and Hendrik Emmens, Eindhoven, Netherlands, assignors to Radio Corporation of America, a corporation of Delaware Application October 7, 1931, Serial No. 567,418
In the Netherlands October 11, 1930

9 Claims. (Cl. 175—366)

The invention relates to an electrode system consisting of two electrodes of different material which are separated by an intermediate layer of a third material. On account of their unsymmetrical conductivity such electrode systems are frequently utilized as rectifiers, commonly known as rectifiers of the dry contact type, although there are also other possibilities of application, for example, the use as a condenser for smoothing a pulsatory direct current. For the intermediate layer between the two outer electrodes use has already been made of insulating substances, for example, a metal oxide which can very easily be formed as an oxide film on an electrode consisting of metal.

According to the invention, free sulphur is utilized for the intermediate layer. It has been found that with such an intermediate layer very favourable results can be obtained more particularly when the one electrode consists of aluminium, a lighter metal of the third group of the periodic system. Other favourable metals for constituting these electrodes are magnesium, a lighter metal of the second group, and the metals silicon, titanium, zirconium, hafnium and thorium of the first sub-group of the fourth principal group of the periodic system.

As the constituent material of the electrode arranged opposite this metallic electrode there may be employed various substances known for this purpose, of which some will be mentioned hereinafter. It has been found that the working may be improved still more by adding to this electrode a substance which evolves oxygen, for example $KMnO_4$, $BaO_2$ or $KClO_3$.

One of the electrodes of an electrode system built up in accordance with the invention and having very favourable properties consists of aluminium, the other being a composite electrode consisting essentially of a mixture of $CuS$, $Cu_2S$ and $KMnO_4$ whereas the intermediate layer consists of sulphur.

Figure 1:
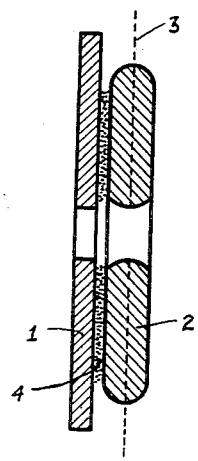

The invention will be more clearly understood by referring to the accompanying drawing which represents an embodiment thereof. In this drawing Figure 1 represents a cross-section of an electrode system and Figure 2 is a front-view.

The plate 1 consists, for example, of aluminium and the composite electrode or plate 2, for example, of a mixture of cuprous sulphide, cupric sulphide and potassium permanganate. The latter plate has been pressed on to copper gauze 3 so that this plate may be thin and nevertheless preserves the required rigidity. Between the two plates 1 and 2 is provided a layer 4 of free sulphur.

When such a system is employed as a rectifier, the current only flows in the direction from the plate 2 to the plate 1 through the intermediate layer 4. A plurality of such rectifying cells may be assembled according to known circuit-arrangements in order to rectify both waves of the alternating current cycle.

Figure 2:
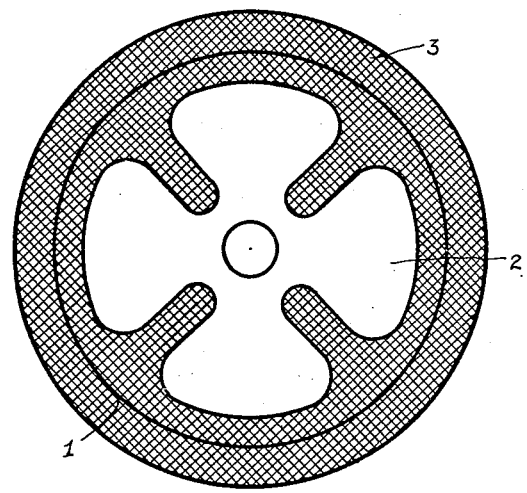

Figure 2 shows that the copper gauze 3 projects beyond the circumference of the plate 2, which is conducive to a satisfactory cooling and for this purpose the plate 2 is provided, in addition, with incisions.

In addition to the metals mentioned hereinbefore, many other substances may be employed for forming the plate 1 such, for example, as cerium, calcium, copper and many other metals or alloys of different metals.

For the electrode arranged opposite these electrodes and acting in a rectifier system as an anode, may be employed in addition to the substances already mentioned, inter alia copper iodide to which may be added free iodine, phosphorus, lead sulphide, molybdenum sulphide, iron sulphide, lead dioxide, cadmium dioxide or mixtures of these substances.

What we claim is:

1. In an electrode system for dry contact rectifiers, the combination of two juxtaposed electrodes, one comprising a metal of the first sub-group of the fourth principal group of the periodic system, and the other comprising copper sulfide and a metallic oxide, and a layer of free sulfur interposed between and in contact with opposed surfaces of both electrodes.

2. In an electrode system for dry contact rectifiers, an electrode of film-forming metal and a juxtaposed composite electrode comprising copper sulfides and an inorganic oxygen evolving compound, and a layer of free sulfur interposed between and in intimate contact with the opposed surfaces of said electrodes.

3. In an electrode system for dry contact rectifiers, a composite electrode comprising copper sulfides and an inorganic oxygen evolving compound, a layer of free sulfur on the surface of said composite electrode, and a metal electrode of a lighter metal of the second or third groups of the periodic system mounted with its surface in contact with said layer of free sulfur.

4. In an electrode system for dry contact rectifiers, a composite electrode consisting of a mixture of cuprous and cupric sulfides and potassium permaganate, a layer of free sulfur adjoining a surface of said composite electrode, and an aluminum electrode adjoining said layer of free sulfur.

5. In an electrode system for dry contact rectifiers, a composite electrode comprising copper sulfides and an inorganic oxygen evolving compound, a layer of free sulfur on the surface of said composite electrode, and a magnesium electrode in intimate contact with said layer of free sulfur.

6. In an electrode system for dry contact rectifiers, the combination of two juxtaposed electrodes, one comprising a metal of the first subgroup of the fourth principal group of the periodic system, and the other comprising copper sulphide and a metallic oxide, and a layer of free sulphur interposed between and in contact with opposed surfaces of both electrodes, one of said electrodes having a sheet of metallic gauze embedded therein.

7. In an electrode system for dry contact rectifiers, the combination of two juxtaposed electrodes, one comprising a metal of the first subgroup of the fourth principal group of the periodic system, and the other comprising copper sulphide and a metallic oxide, and a layer of free sulphur interposed between and in contact with opposed surfaces of both electrodes, one of said electrodes being pressed on to a sheet of copper gauze which extends for an appreciable distance beyond the peripheral edge of said electrode.

8. In a rectifier of the dry contact type, a pair of juxtaposed electrodes, and a sheet of metallic gauze material embedded in one of said electrodes.

9. In a rectifier of the dry contact type, a pair of juxtaposed flat electrodes, and a sheet of similarly shaped copper gauze embedded in one of said electrodes and extending for an appreciable distance beyond the peripheral edge of said electrode.

WILLEM CHRISTIAAN van GEEL.
HENDRIK EMMENS.